US011228328B1

(12) United States Patent
Veyseh et al.

(10) Patent No.: US 11,228,328 B1
(45) Date of Patent: Jan. 18, 2022

(54) INTEGRATED RADIO FREQUENCY TRANSCEIVER

(71) Applicant: SiTune Corporation, San Jose, CA (US)

(72) Inventors: Marzieh Veyseh, Los Altos, CA (US); Vahid M Toosi, Los Altos, CA (US); Saeid Mehrmanesh, San Jose, CA (US)

(73) Assignee: SiTune Corporation, San Jose, CA (US)

( * ) Notice: Subject to any disclaimer, the term of this patent is extended or adjusted under 35 U.S.C. 154(b) by 0 days.

(21) Appl. No.: 17/201,980

(22) Filed: Mar. 15, 2021

(51) Int. Cl.
*H04B 1/04* (2006.01)
*H04B 1/10* (2006.01)

(52) U.S. Cl.
CPC ......... *H04B 1/0483* (2013.01); *H04B 1/0475* (2013.01); *H04B 1/10* (2013.01); *H04B 2001/0491* (2013.01)

(58) Field of Classification Search
CPC ...... H04B 1/0475; H04B 1/0483; H04B 1/10; H04B 2001/0491
See application file for complete search history.

(56) References Cited

U.S. PATENT DOCUMENTS

| 5,280,636 | A | * | 1/1994 | Kelley | H04B 1/005 375/240 |
| 6,574,459 | B1 | * | 6/2003 | Kaminski | H04B 7/084 455/272 |
| 7,403,508 | B1 | * | 7/2008 | Miao | H04B 1/692 370/335 |
| 2015/0207536 | A1 | * | 7/2015 | Yehezkely | H01Q 3/24 455/78 |

* cited by examiner

*Primary Examiner* — David B Lugo
(74) *Attorney, Agent, or Firm* — Platinum Intellectual Property LLP

(57) ABSTRACT

A direct digital radio having a high-speed RF front end in communication with an antenna, and a radio subsystem that can be configured to form a programmable multi-standard transceiver system. The high-speed RF front including RF inputs configured to receive a plurality of radio frequencies (e.g., frequencies between 400 MHz to 7.2 GHz, millimeter wave frequency signals, etc.) and wideband low noise amplifiers provides amplified signals to RF data converters, analog interfaces, digital interfaces, component interfaces, etc. The programmable multi-standard transceiver is operable in frequencies compatible with multiple networks such as private LTE and 5G networks as well as other wireless IoT standards and WiFi in multi-standard network access equipment. The programmable multi-standard transceiver can greatly reduce complexity for the baseband processing, lower the cost of the overall transceiver system, reduce power consumption, and at the same time, benefit from improvements on the digital functions through integration.

20 Claims, 8 Drawing Sheets

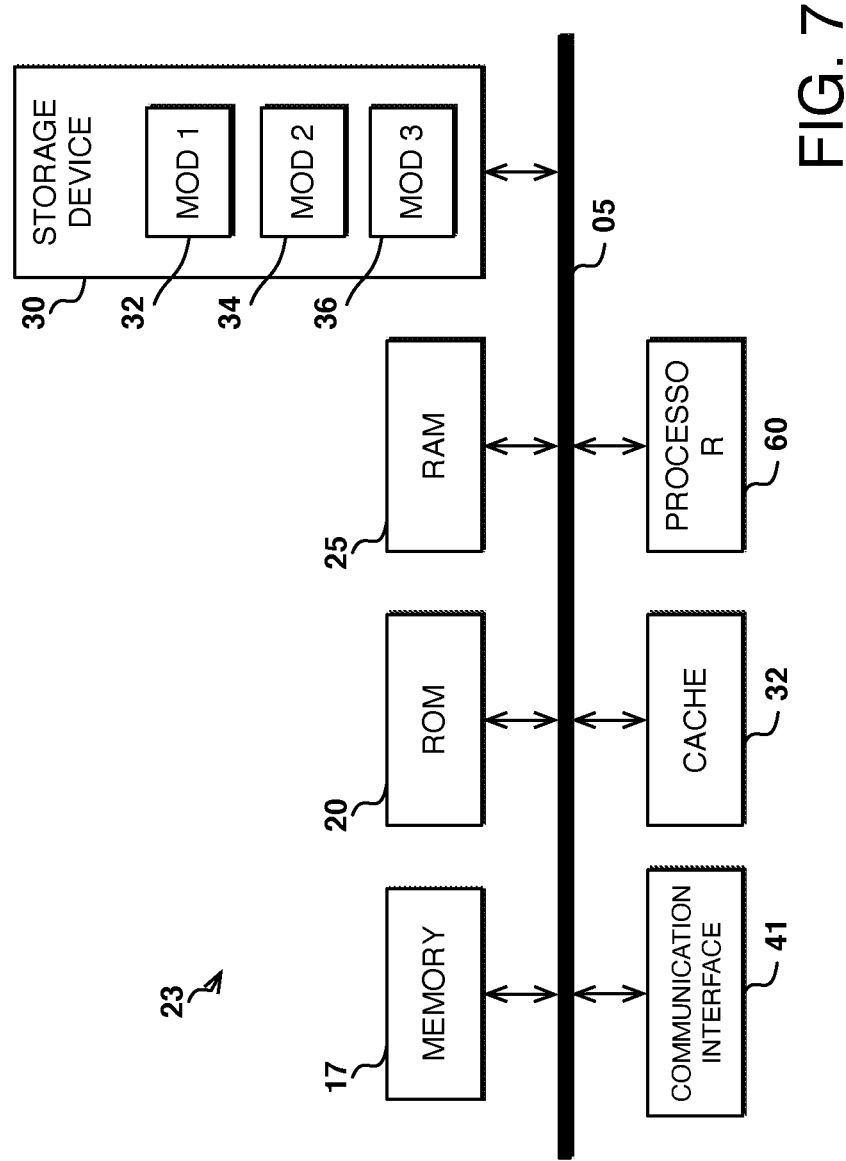

INTEGRATED RADIO FREQUENCY TRANSCEIVER

BACKGROUND

Developments in communications technology, namely 5G, LTE, WiFi, and other wireless technologies are leading to an astounding number of users being connected on a global basis over networks, which has further contributed to a speedy development towards the Internet of Things (Iot). These users as well as devices and "Things" necessitate to be mobile and in turn require more data from a network (e.g., a wireless network) for applications such as streaming video, music, interactive applications, games, and the like. In addition to these high bandwidth applications, some applications require high density deployment of sensors and actuators for use in smart cities and connected vehicles, which requires latency to be minimized to milliseconds, and reliability has to be maximized to ensure data delivery. Such requirements create a significant challenge for businesses and infrastructure. What is needed is a low power consumption approach to transmit and receive content for high bandwidth applications.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates example components of an access device, such as the access device illustrated in FIG. 6.

DETAILED DESCRIPTION

Figure 1:
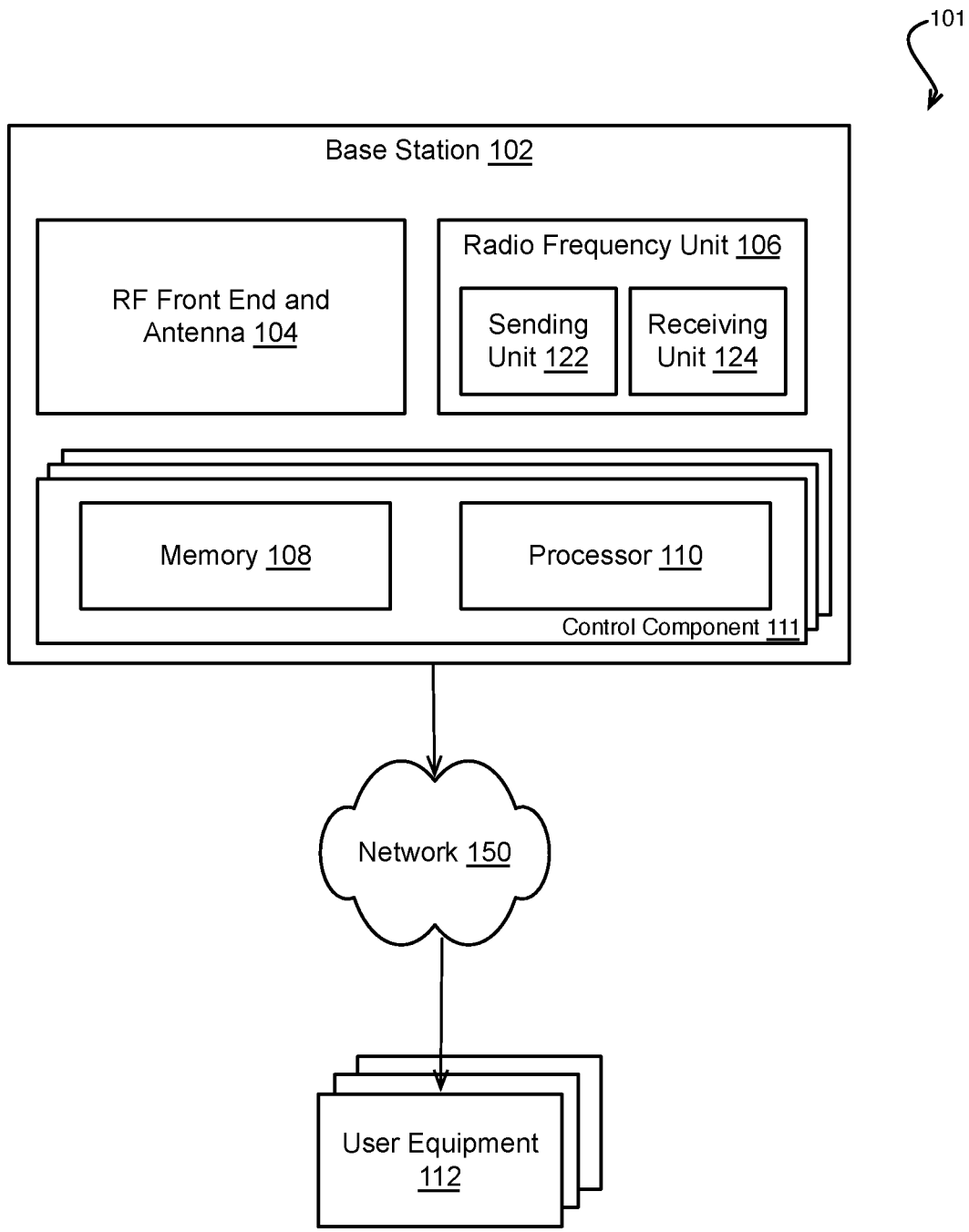
FIG. 1 illustrates a block diagram of a network provider environment capable of delivering high-bandwidth content that can be utilized in accordance with various embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Systems and methods in accordance with various embodiments of the present disclosure may overcome one or more of the aforementioned and other deficiencies experienced in conventional approaches to processing communications signals. In particular, various embodiments describe systems and methods for processing communications signals at a programmable network access device (e.g., remote radio heads, network equipment, macrocells, radio frequency units, etc.) or other such devices that include high-speed transceivers that support low noise, high frequency, high-speed communications on wider bandwidth while limiting power consumption. For example, a wideband communications signal can be received at a programmable base station such as a network access device (e.g., a remote radio head) or other such devices including transceiver systems that are operable to enable wireless communication between users of computing devices (e.g., portable computing devices) and data networks. The access devices can be part of, e.g., private networks (e.g., LTE, 5G) as well as other wireless IoT standards and WiFi in multi-standard network access devices, or another appropriate network. The user, for example, can be a consumer of high bandwidth applications provided via one or more network providers that enable access to media content, such as video, data, voice, high-speed Internet services, etc.

The network access device can include components operable to process the communications signal to enable access to, for example, video, data, voice, high-speed Internet services. At least some of the components can include, for example, a fully integrated transceiver including wideband low noise amplifiers, with reduced power and increased linearity of the frequency of the transmit path Other components include, for example, RF inputs configured to receive a plurality of radio frequencies (e.g., frequencies between 00 MHz to 7.2 GHz, millimeter wave frequencies, etc.), RF data converters (e.g., ADCs and DACs), analog interfaces, digital interfaces, interfaces for components (e.g., DAC component), etc. The network access device can be programmable, and thus, operable in frequencies compatible with multiple networks such as private LTE and 5G networks as well as other wireless IoT standards and WiFi in multi-standard network access equipment.

Advantageously, network providers, for example, wireless network providers and/or wireless network equipment providers, can provide high bandwidth services while reducing power consumption and optimizing transceiver performance of network access devices that enable users to access such services with a greater number of transmit/receive path segments.

Various other functions and advantages are described and suggested below as may be provided in accordance with the various embodiments.

FIG. 1 illustrates a block diagram of a wireless communications system 101 in which aspects of the various embodiments can be implemented. It should be understood that reference numbers are carried over between figures for similar components for purposes of simplicity of explanation, but such usage should not be construed as a limitation on the various embodiments unless otherwise stated.

In this example, base station 102 is in communication with user equipment 112 via network 150. Base station 102 can include, for example, a network access device, such as a remote radio head or remote radio unit, a small cell, or other network devices for facilitating access to a network for computing devices. User equipment 112 can include, for example, a portable computing device (e.g., a smartphone, an e-book reader, or tablet computer) desktop computers, notebook computers, personal data assistants, cellular phones, video gaming consoles or controllers, smart televisions, wearable computers (e.g., smartwatches or glasses), portable media players, smart vehicles (e.g., cars, underwater drones, aerial drones, etc.), sensing devices, Internet of Things (JOT) devices, smart locks, home appliances, security devices, smart infrastructure (e.g., city lights, traffic monitoring systems, etc.), customer-premises equipment, as well as various other types of electronic devices having appropriate data processing capabilities.

Network 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, a private network, or another network 150 or a combination of two or more such networks 150.

Network 150 can be provided by one or more network operators, including, for example, mobile network operators (MNOs) and other wireless service providers, and can support multiple standards. For example, the network can support wireless standards such as WiFi, 5G, LTE 4G, Zigbee, as well as other internet of things (JOT) standards. In a specific example, network 150 can include LTE isolated private networks that use unlicensed band (e.g., 5.1 GHz-7.2 GHz) of operation, LTE private network using shared or leased licensed spectrum (e.g., C-band and frequencies up to 5 GHz)/

Network 150 can be isolated and independent of a MNO, utilizing unlicensed bands (e.g., 5.1 GHz-7.2 GHz) and can be built by an enterprise or a third-party network provider who might be partnering with MNOs. They can also be isolated and built by a MNO utilizing licensed shared or leased bands. If not isolated, these networks can share public network resources utilizing a licensed shared or leased spectrum and be built by MNOs. They can share radio access network (RAN) and control planes of public networks.

Network 150 can be provided by, or otherwise utilized, by one or more network providers, and enables for one or more Internet data services, media services, voice services, etc., to be provided to one or more end users via user equipment. To provide these services, base station 102, in an embodiment, is shown in communication with user equipment 112 via network 150. It should be noted that other services are contemplated by the embodiments described herein. Such services may include, for example, wireless services and other such services.

Base station 102 can include, for example, antenna 104, radio frequency unit 106, memory 108, and processor 110. Base station can include, for example, small cells (e.g., gNodeB/eNodeB), enterprise access equipment, 5G Macro Base Stations, etc. In an example, small cells are low power base stations utilized for increasing network capacity, coverage, and network density. In an embodiment, these small cells can be deployed as private or public networks in an indoor or outdoor environment. Small cell public Remote Radio Head (RRH) and small cell private or enterprise user equipment include the RF circuitry of a base station enclosed in a small module or a gateway. The small cell equipment performs all RF functionality like transmit and receive functions, filtering, and amplification.

In an embodiment, applications for small-cell networks include smart cities transportation (e.g., delivery of critical services with tight security requirements), ports (e.g., automation and connected things), remote industrial—oil, gas, and mines (e.g., secure, machine remote control operations to reduce costs and increase safety), factory and online retail automation (e.g., reliability, speeds, security, and flexibility in factory automation), stadiums, shopping centers, campus site management, parking, healthcare (e.g., secure communications among nurses, doctors, patients; monitoring equipment), rural service mobile broadband, etc.

Antenna 104 and radio frequency unit 106 are configured to receive and transmit a radio frequency signal, and perform conversion between a radio frequency signal and a baseband signal. The combination of antenna 104 and radio frequency unit 106 may be referred to as a transceiver unit, a transceiver, a transceiver circuit, a transceiver, or the like. In certain embodiments, a transceiver unit includes only a radio frequency unit or a part of a radio frequency unit.

Radio frequency unit 106 is configured to perform radio frequency processing. For example, radio frequency unit 106 includes receiving unit 124 configured to implement a receiving function, and sending unit 122 configured to implement a sending function. Receiving unit 124 may also be referred to as a receiver, a receiver circuit, or the like, and sending unit 122 may be referred to as a transmitter, a transmitter circuit, or the like. Receiving unit 124 and sending unit 122 will be described further herein.

Control component 111 includes memory 108 and processor 110, and is configured to perform baseband processing, control the base station, and the like. Control component 111 may be referred to as a processing unit. Control component 111 may include one or more boards or chips. Each board or chip may include one or more processors and one or more memories. The processor is configured to read and execute a program in the memory, to implement a baseband processing function and control the base station. If a plurality of boards exist, the boards may be interconnected to increase a processing capability. In an optional implementation, alternatively, the plurality of boards may share one or more processors, or the plurality of boards share one or more memories. Processor 110 and memory 108 may be integrated together, or may be disposed separately. In some embodiments, antenna 104, radio frequency unit 106, and control component 111 may be integrated together, or may be disposed separately. In addition, functions of control component may be integrated in a chip for implementation; or some functions may be integrated in a chip for implementation, and the other functions may be integrated in other one or more chips for implementation.

As described, developments in communications technology, namely 5G, LTE, and WiFi, have resulted in an increase in RF transceivers. However, conventional RF transceivers consume relatively high power (e.g., 2 W power for a combined transmit/receive path). Additionally, these RF transceivers lack RF gain, thus, an additional amplifier is often required on the front-end, requiring development time and increased cost. Further, these RF transceivers are narrowband and zero-IF based architecture, thus, modulation capabilities are limited and not sufficient for many low noise, high frequency, high band width applications. Further, conventional approaches including the Super-heterodyne Receiver, Low IF Single Conversion Receiver, and Zero-IF or direct conversion techniques have imitations. For example, with the Super-heterodyne Receiver, to avoid IQ imbalance and to keep the image rejection filter implementation practical, use high frequency IF filters after mixing while a second mixer brings the signal to baseband. However, the cost and power dissipation issues and the specificity of the IF filter to the bandwidth of the signal to the standard used make super-heterodyne receivers unsuitable for multi-standard operation. Also, with low IF single conversion receivers, the issue of image rejection filtering even in lower IF frequencies exist given the complexity of the filter, which will create additional IQ imbalance problems.

Zero-IF or direct conversion receivers have been used for mobile applications due to several qualities that make them suitable for multi-band, multi-standard applications. The dominant challenge that has plagued Zero-IF architecture for years has been to maintain I/Q balance for acceptable levels of image rejection, LO leakage, and DC offsets. In recent years, the advanced integration and digital domain calibrations, has overcome these challenges to some extent. However, with the new developments in wireless networks and the demand for faster more reliable connections, channel bandwidth, as well as frequency bands, are substantially increased. With this change, the advantages of Zero-IF techniques are eliminated, or at least reduced to unsatisfactory levels since IQ imbalance correction in bandwidths higher than 40 MHz even in the digital domain is not trivial given that the imbalance is frequency-dependent. Also, the baseband filters are no longer low power and low cost, since bandwidths are larger, and filters have to be designed off-chip especially in the transmitter side where PA correction techniques demand for 3 to 5 times wider bandwidth support than the channel itself.

The Direct RF sampling approach has long been sought after due to its many advantages in terms of performance and implementation. The obstacles have been operating the converters at a higher speed while maintaining power efficiency and supporting high dynamic range to attain proper SNR performance.

Accordingly, in accordance with various embodiments, approaches include a fully integrated programmable transceiver (e.g. 500 mW power consumption for transmit and receive path working at the same time on two different center frequency channels) including wideband low noise amplifiers with reduced power and increased linearity of the frequency of the transmit path components include, for example, data converters, digital interfaces, analog interfaces, component interfaces, etc. The network access device can be programmable, and thus, operable in frequencies compatible with multiple networks such as private LTE and 5G networks as well as other wireless IoT standards and WiFi in multi-standard network access equipment.

Figure 2A:
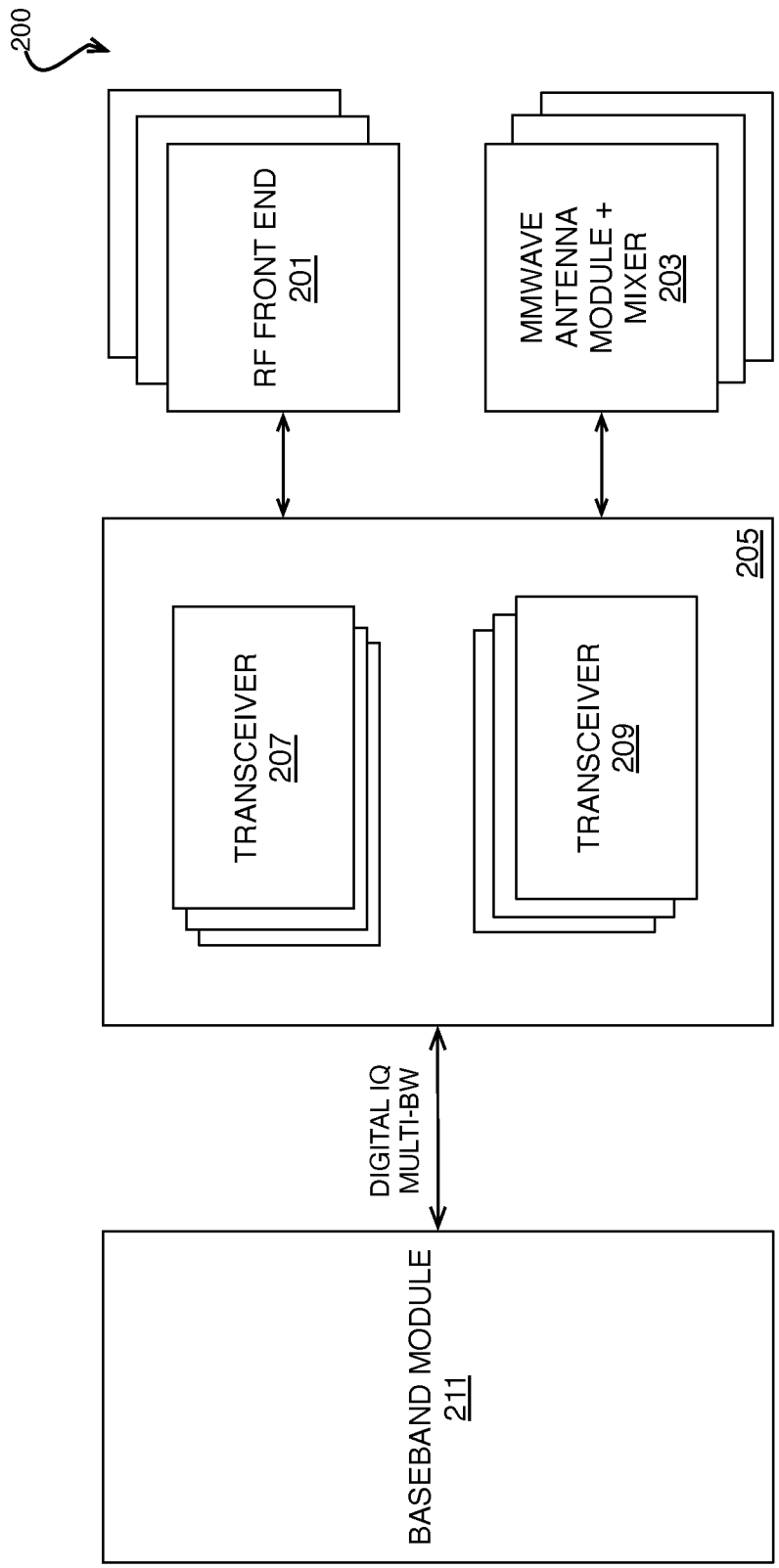
FIG. 2A illustrates an example transceiver system in accordance with an embodiment.

FIG. 2A illustrates an example arrangement of components for a wireless communication system in an embodiment. In this example, RF front end 201 and millimeter wave antenna module & mixer 203 can be coupled to a converged novel transceiver module 205. Transceiver module 205 includes a unique architecture and combines the functionalities of transceiver component 207 and the functionalities of transceiver component 209 into one transceiver architecture. This helps provide hardware design flexibility by offering radio components associated with below 7 GHz of frequencies as well as radio components associated with mmWave in terms of Intermediate frequency digitization converged into one transceiver. This is a pluggable solution that reduces cost of hardware design and enables various features such as back up and assistance for mmWave communication using the sub-7 GHz communications as well roll out and application-based transmission and reception in private networks and public networks.

RF front end 201 can include a number of components, including, for example, bandpass filters, and RF amplifiers. In an embodiment, RF front end 201 and transceiver component 207 can be configured to implement radio frequency processing. For example, RF front end 201 and transceiver component 207 can be configured to receive and transmit a RF signal, and perform conversion between a RF signal and a baseband signal. The RF signal can include, for example, wireless signals on sub-6 GHz frequencies or 6 GHz frequencies.

Millimeter wave antenna module & mixer 203 can include a number of components, including, for example, mixers, etc., to obtain millimeter spectrum (e.g., 24- to 300-GHz frequency band). Millimeter wave antenna module & mixer 203 processes millimeter wave frequency signals and down converts/upconverts the signal to an intermediate frequency, for example, between 3 GHz-7.2 GHz. Transceiver 209 can be configured to receive and transmit a millimeter wave frequency signal, and perform, for example, down conversion from millimeter wave frequency to digital IQ signal. In an embodiment, millimeter wave antenna module & mixer 203 can include appropriate antenna to receive a millimeter wave frequency signal and mixer to down convert a millimeter wave frequency signal to an IF.

Baseband module 211 is configured to perform baseband processing. For example, baseband module 211 can convert digital data into radio frequency signals (and vice-versa) which can then be transmitted over a RAN (Radio Access Network) or virtualized network. In an embodiment, RAN is part of a cellular communications network, and connects a user's mobile phone or other wireless user equipment (UE) to the telecommunications operator's Core Network (CN). The CN then provides the user access to other users on the same network, to different operators' networks or to the Internet. A virtualized network is a network architecture which virtualizes network functions in software platforms based on general purpose processors.

Figure 2B:
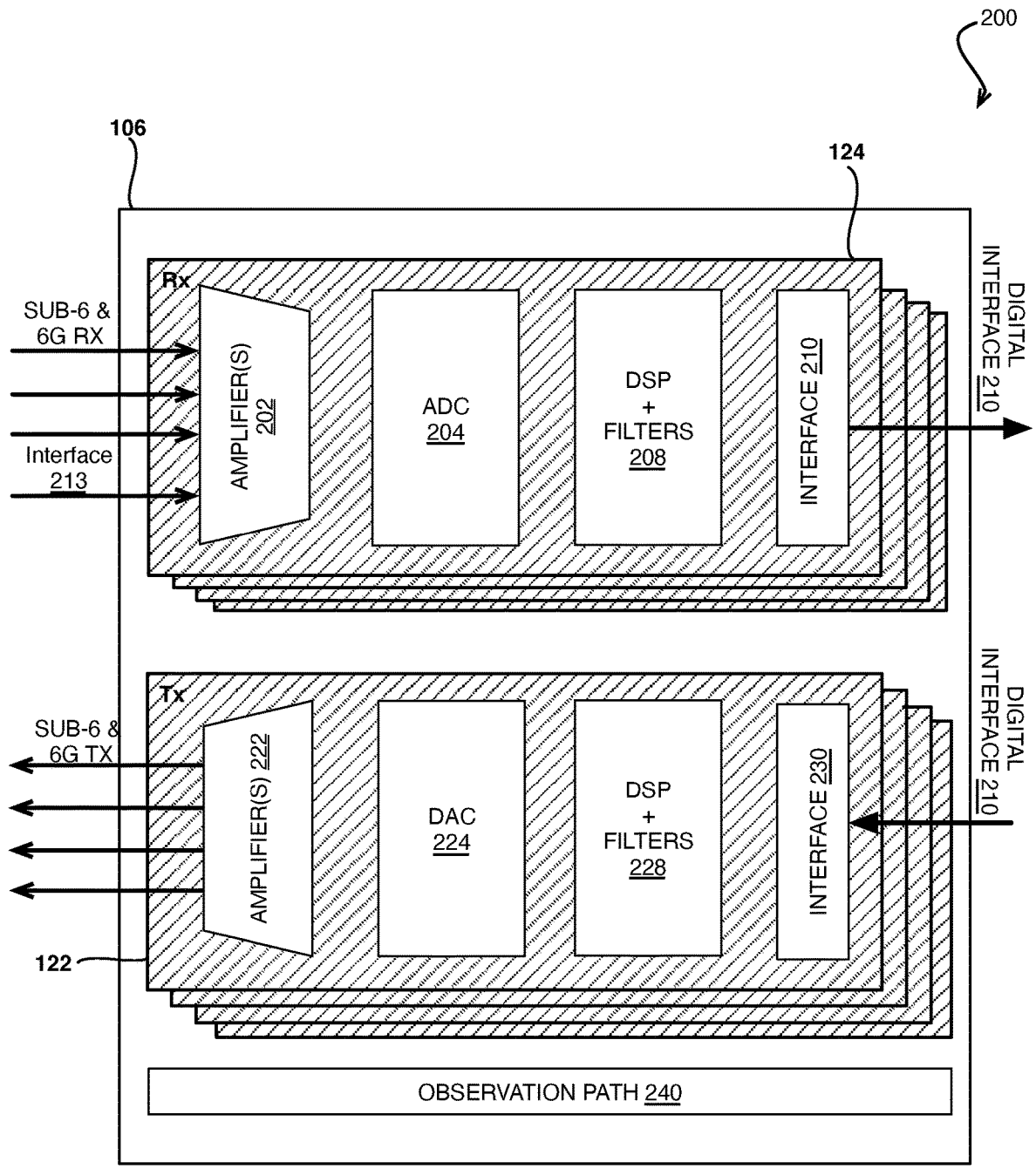
FIG. 2B illustrates an example transceiver system in accordance with an alternative embodiment.

FIG. 2B illustrates a block diagram of an integrated multi-standard radio frequency unit similar to FIG. 1, but illustrates additional component in accordance with an embodiment. In this example, radio frequency unit 106 includes an integrated receiving unit 124 and sending unit 122. Generally, radio frequency unit 106 is used to transmit or receive radio signals between two devices. More specifically, sending unit 122 transmits radio signals and receiving unit 124 receives radio signals. The antenna and RF front end unit can include a duplexer (not shown) which can serve to isolate the transmit path and the receive path while permitting both to share a common antenna. In some embodiments, the transceiver system is a full duplex system (without a duplexer), where two or more paths can transmit and receive at the same time.

Receiving unit 124 includes a receive path to receive a communications signal. The receive path can support multiple frequency ranges. For example, the receive path can support millimeter wave frequencies signals, down converted to intermediate frequencies (IF) below 7.2 GHz, sub-6 GHz licensed LTE or 5G New Radio Bands and 6 GHz unlicensed frequencies between 5 GHz and 7.2 GHz. The receive path can be represented by or associated with at least amplifier(s) 202, variable rate analog-to-digital converter (ADC) 204, digital signal processor (DSP) and filters component 208, digital interface 210, and millimeter wave frequency signal input interface 213. As will be described further herein, additional receive paths can be provided for more receive channels/bands, depending on the application.

For example, a first group of receive paths can allow for, e.g., sub-6 GHz and 6 GHz frequencies, and a second receive path can receive, e.g., millimeter wave frequency signal down converted to IF frequencies.

In an embodiment, a communications signal is received at an RF input of radio frequency unit 106 based on the frequency range of the communications signal. For example, a first RF input receives a first RF input signal (e.g., a first receive signal) at a first frequency range and a first bandwidth, including, e.g., RF signals between 400 MHz up to 1 GHz, a second RF input receives a second RF input signal (e.g., a second receive signal) at a second frequency range and a second bandwidth, including, e.g., RF signals between 1.4 GHz up to 2.7 GHz, a third RF input receives a third RF input signal (e.g., a third receive signal) at a third frequency range and a third bandwidth for RF signals between 3.2 GHz to 5.2 GHz, and a fourth RF input receives a fourth RF input signal (e.g., a fourth receive signal) at a fourth frequency range and a fourth bandwidth including, e.g., RF signals between 5.2 GHz to 7.2 GHz. In an embodiment, the frequency ranges can be based on, for example, bands allocated to LTE 4G/5G as well as WiFi and WiFi 6 and unlicensed bands defined for 5G and WiFi.

The plurality of input RF signals can be received at amplifier(s) 202. Amplifier(s) 202 can include, for example, a plurality of low noise amplifiers (LNAs) and analog wide-band filters. Amplifier(s) 202 can be operably coupled to amplify the plurality of input signals to generate amplified input RF signals. The plurality of input signals can be amplified in certain embodiments according to an appropriate required signal power level for radio frequency unit 106. For example, amplifier(s) 202 can be configured to have enough gain with low noise figures to set the system noise figure. This can include, for example, setting the system noise figure such that it is linear enough to not distort the desired signal in the presence of undesired signals and be able to handle high desired signals without distortion.

Variable rate analog-to-digital converter (ADC) 204 can receive and digitize amplified input RF signals to generate digital signals. In an embodiment, ADC 204 can receive and digitize a band as wide as, e.g., 1.2 GHz. In accordance with various embodiments, ADC 204 can be a set of time-interleaved ADCs that together can digitize an entire band of several giga hertz. In an embodiment, ADC 204 may consist of M parallel ADCs. The ADCs are configured to convert a continuous-time and continuous-amplitude analog signal to a discrete-time and discrete-amplitude digital signal. In accordance with various embodiments, when the ADCs perform the analog to digital conversion, the ADC samples the analog signal. The resulting digital signal is a sampled signal, obtained by sampling the analog signal at discrete points in time. The rate at which the ADCs sample the analog signal is the sampling rate.

DSP and filters component 208 includes digital mixers and filters to generate the baseband digital signal after receiving the signal from ADC and can be operably coupled to receive the filtered digital signals. DSP and filters component 208 can perform baseband processing using various radio frequency (RF) functions. In an embodiment, DSP and filters component 208 can be implemented on a Field Programmable Gate Array (FPGA) or an Application Specific Integrated Circuit (ASIC). DSP and filters component 208 can generate variable bandwidth signals. For example, in the situation amplifier 202 receives an 800 MHz band signal at 3.2 GHz, an 800 MHz band signal is received at DSP and filters component 208. DSP and filters component 208 is configured to separate the 800 MHz band signal as a 100 MHz channel, a 200 MHz channel, two 100 MHz channel, or four 200 MHz channel. Advantageously, separating the band signal provides for flexibility in terms of wireless signal frequency and wireless signal bandwidth. The baseband processing can include heavy duty or highly intensive digital functions. For instance, DSP and filters component 208 can include digital down conversion (DDC) for down converting the sample rate of a digital signal of the receive path.

Digital interface 210 can be configured to interface with a baseband processor, and cover a range of signal bandwidths (e.g., multiple 100 MHz or 400 MHz signals converted to bits).

Interface 213 can be configured to receive intermediate frequency signals, including, for example, millimeter wave frequency signals that are down converted to IF. In an example, the millimeter wave frequency signals can include radio waves within the frequency range of 24-399 GHz. The IF frequency signals can be received at amplifier 202. The output of amplifier 202 can be received at ADC 204. A variable attenuator can be configured to, for example, reduce the strength of an alternating-current signal either continuously or in steps, without causing appreciable signal distortion, by maintaining a substantially constant impedance match.

Sending unit 122 includes a transmit path to transmit a signal. The transmit path can be represented by at least amplifier(s) 222, digital-to-analog converter (DAC) 224, DSP component 228, and interface 230. The transmit signal may be amplified by amplifiers 222 prior to transmission over an antenna. More transmit paths can be provided for more transmit channels/bands, depending on the application. DSP component 228 can perform baseband processing using various baseband functions. In an embodiment, baseband processing includes digital pre-distortion (DPD) to predistort or adjust the digital signal to improve the linearity of amplifiers 222. The baseband processing can include crest factor reduction (CFR) for limiting the dynamic range of the transmit signal. The baseband processing can include digital up conversion (DUC) for up converting the sample rate of a digital signal of the transmit path.

In an embodiment, to provide (closed-loop) digital pre-distortion, radio frequency unit 106 can include an observation receive (ORX) path 240 for observing the output of amplifier(s) 222 and providing a feedback signal to a pre-distortion DPD component to improve the linearity of the transmit path and/or amplifier(s) 222 for the transmit path. In some cases, the ORX path can be provided externally by some other component. The ORX path can be represented by at least, e.g., a mixer, a filter, and an analog-to-digital converter, where the mixer may share a common local oscillator (LO) with the mixer of the transmit path.

In various embodiments, receiving unit 124 and sending unit 122, or the components of receiving unit 124 and sending unit 122, can be electrically coupled to additional components of the access device or in electrical communication of the access device. In certain embodiments, receiving unit 124 and sending unit 122, and other components, can be implemented, for example, with digital logic gates on a single or multiple semiconductor chips configured to perform the functions described herein. In another example, computing component can be implemented with one or more semiconductor devices using a CMOS process. For example, the majority of the front-end computing component can be implemented as part of or the entirety of an application specific integrated circuit (ASIC) by digital logic gates. It is also envisioned that for certain applications, some or all of the functions of the front-end computing components can be implemented with software instructions stored on a processor readable medium, and executed by a processor, or another processor in another device.

Figure 3:
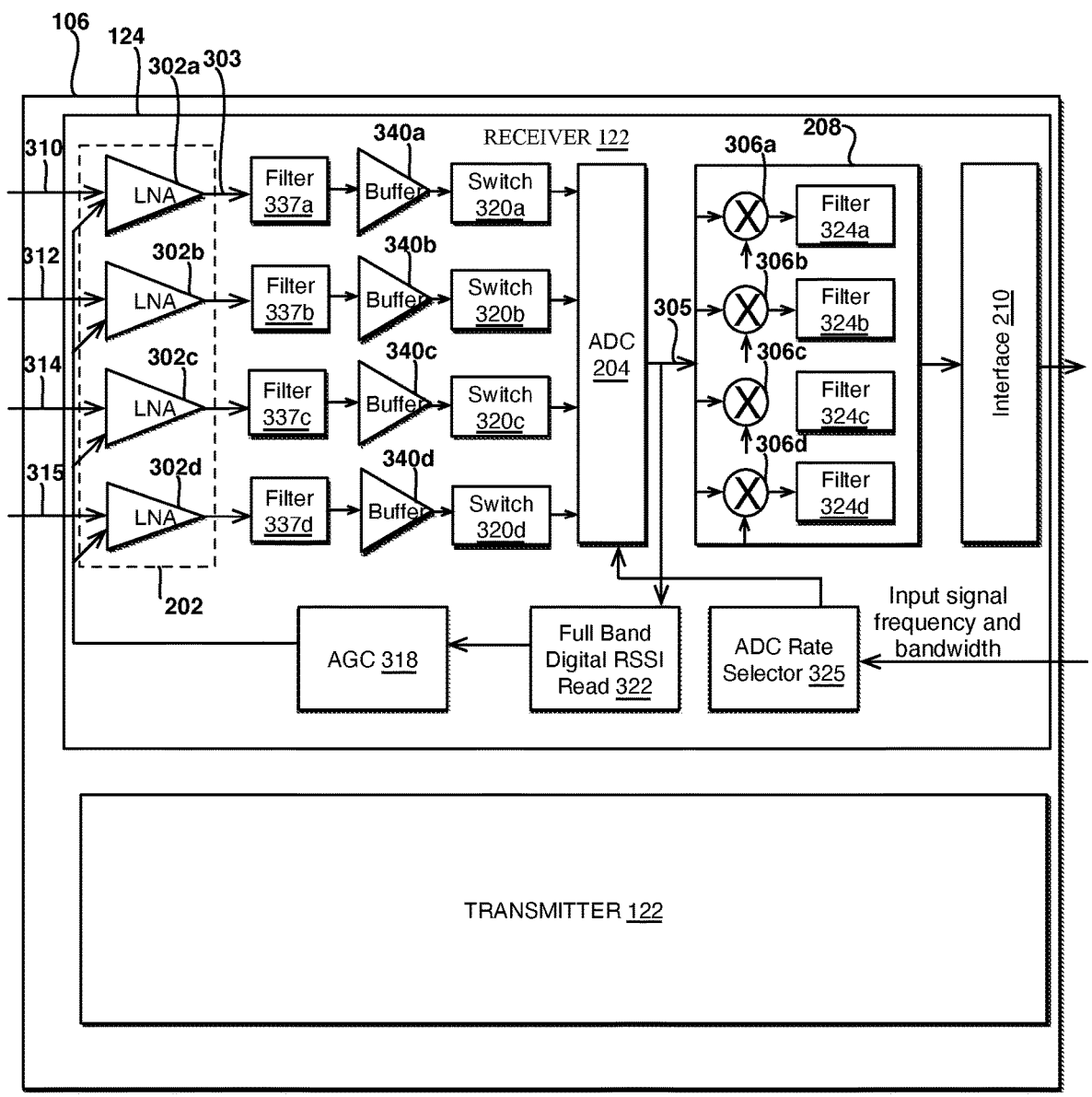
FIG. 3 illustrates an example receive component of a transceiver system in accordance with an embodiment.

FIG. 3 illustrates a block diagram of a system similar to FIG. 2B, but illustrates additional components in accordance with an embodiment. In this example, a base station such as a small cell includes radio frequency unit 106. It should be noted that radio frequency unit 106 can include one or more components configured to receive and send radio frequency signals. In various embodiments, radio frequency unit 106, or the components of radio frequency unit 106, can be electrically coupled to additional components of the access device or in electrical communication of the access device. In certain embodiments, radio frequency unit 106, and other components, can be implemented, for example, with digital logic gates on a single or multiple semiconductor chips configured to perform the functions described herein. In another example, computing component can be implemented with one or more semiconductor devices using a CMOS process. For example, the components can be implemented as part of or the entirety of an application specific integrated circuit (ASIC) by digital logic gates. It is also envisioned that for certain applications, some or all of the functions of the computing components can be implemented with software instructions stored on a processor readable medium, and executed by a processor, or another processor in another device.

Figure 4:
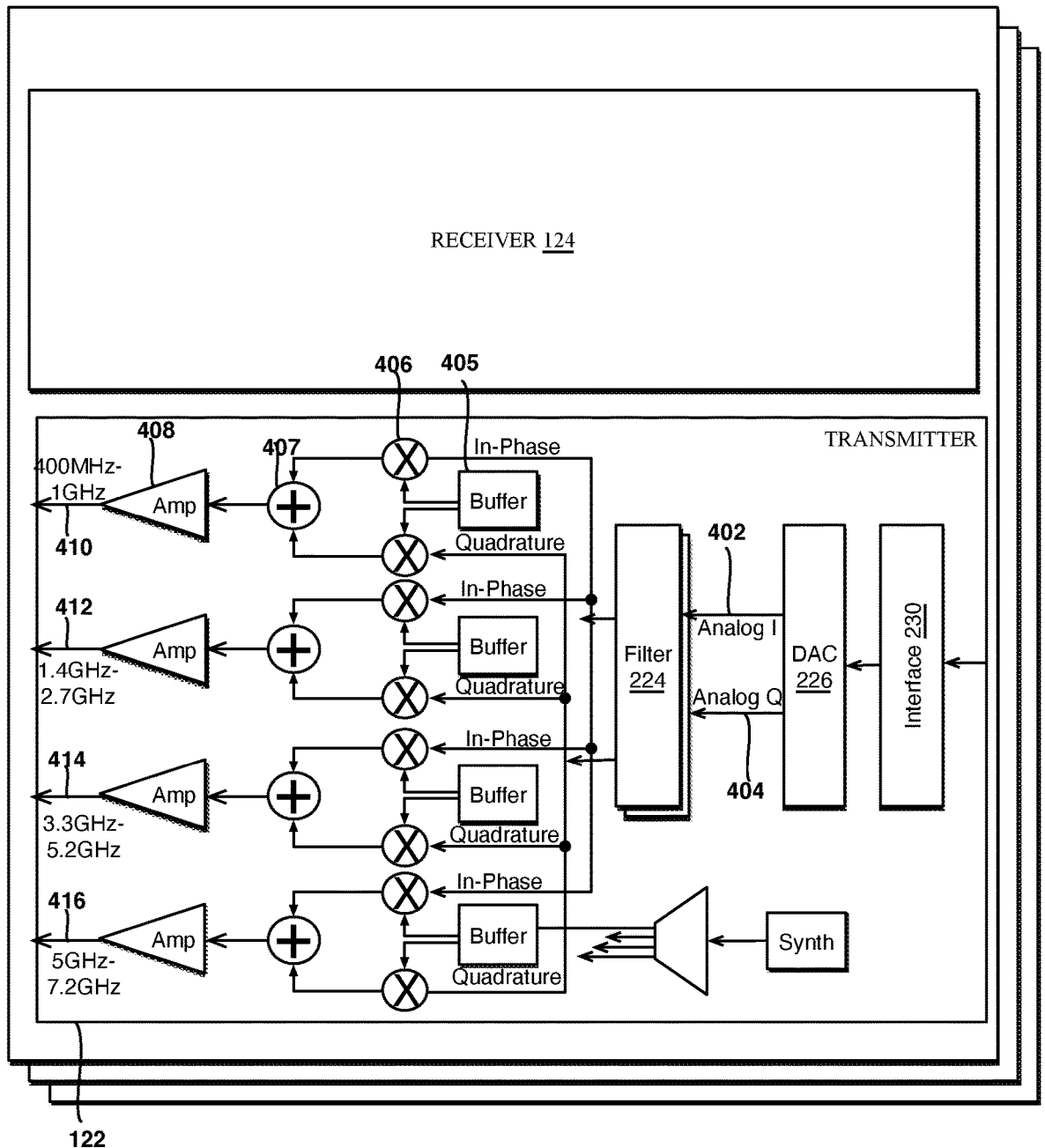
FIG. 4 illustrates an example transmit component of a transceiver system in accordance with an embodiment.

As described, radio frequency unit 106 includes receiving unit 124 and sending unit 122. As illustrated in FIG. 3, additional components of receiving unit 124 will be described. FIG. 4 describes additional components of sending unit 122.

Receiving unit 124 includes a plurality of receiving paths for receiving a signal. The receiving paths can be represented by low noise amplifiers (302a, 302b, 302c, 302d), filters (337a, 337b, 337c, 337d), buffers (340a, 340b, 340c, 340d), switches (320a, 320b, 320c, 320d), ADC 204, DSP and filters component 208, digital interface 210, ADC rate selector component 325, full band digital RSSI read unit 322, automatic gain control (AGC) 318. DSP and filters component 208 can include mixer(s) (e.g., mixer 306a, 306b, 306c, 306d) and filter(s) (e.g., filter 324a, 324b, 324c, 324d). Receiving unit 124 also includes an ADC rate selector component 325 that selects the sampling rate of ADC 204 based on input signal center frequency and bandwidth.

The plurality of paths can be organized in groups. For example, a first group of paths can correspond to signals in a first frequency range and a second group of paths can correspond to signals in a second frequency range. In an embodiment, the first frequency range can include, for example, sub-6 GHz and 6 GHz frequencies, the second frequency range can include, for example, millimeter IF frequencies below 7 GHz.

In an embodiment, receiving unit 124 is based on direct RF sampling. That is, rather than using a narrow band mixer, the amplifiers (e.g., amplifiers 302a, 302b, 302c, 302d)), high speed ADC 204, and DSP and filters component 208 including digital mixers (e.g., digital mixers 306a, 306b, 306c, 306d) and filters (e.g., filters 324a, 324b, 324c, 324d) can be used to receive a wide-bandwidth signal (also referred to as a communications signal), amplify the wide-bandwidth signal and digitize the entire received signal using ADC 204. Switches 320a, 320b, 320c, 320d in an embodiment can be incorporated inside ADC 204 are can be used to select which input pin is providing the signal to ADC 204 after passing through the LNA 202 related to that pin.

This architecture is defined since various input signals with various center frequencies require their unique low noise amplifier. Accordingly, ADC 204 is configured to select which appropriate LNA (e.g., 302a, 302b, 302c, 302d) is providing the signal based on the center frequency of the signal For example, a communications signal (e.g., an input signal) can be received at an RF input port depending on the frequency range of the input signal. It should be noted that the frequency ranges can be updated and the ranges provided are merely example ranges. In this example, as shown in FIG. 3, RF input port 310 receives a RF input signal specified for RF signals with frequencies between 400 MHz up to 1. GHz. RF input port 312 receives a RF input signal specified for RF signals with frequencies between 1.4 GHz up to 3.2 GHz. RF input port 314 receives a RF input signals specified for RF signals with frequencies between 3.2 GHz up to 5.2 GHz. Millimeter wave signals that are down converted to IF frequencies between 5.2 GHz and 7.2 GHz can use input port 315 for millimeter input signal specified for millimeter wave frequencies between, for example, 24- to 300-GHz. In an embodiment, the frequency ranges can be based on, for example, bands allocated to LTE 4G/5G as well as WiFi and WiFi 6 and unlicensed bands defined for 5G and WiFi.

It should be noted that a receive path can be defined as having multiple receive paths. That is, individual RF input signals can be associated with respective receive paths. For example, a first receive path can include input port 310, amplifier 302a, filter 337a, buffer 340a, switch 320a, ADC 204, digital mixer 306a, filter 324a, and digital interface 210. A second receive path includes input port 312, amplifier 302b, filter 337b, buffer 340b, switch 320b, ADC 204, digital mixer 306c, filter 324c, and digital interface 210. A third receive path includes input port 314, amplifier 302c, filter 337c, buffer 340c, switch 320c, ADC 204, digital mixer 306c, filter 324c, and digital interface 210. A fourth receive path includes input port 315, amplifier 302d, filter 337d, buffer 340d, switch 320d, ADC 204, digital mixer 306d, filter 324d, and digital interface 210. It should be further noted that individual receive paths, beginning at, for example, input ports 310, 312, 314, and 315 couple to a common ADC (e.g., ADC 204).

Once the communications signal is received, the communications signal passes an appropriate amplifier. That is, based on a frequency range of the communications signal, the communications signal is received by an appropriate input port, the input being coupled to an amplifier. For example, a first RF input signal at a first frequency range passes amplifier 302a; a second RF input signal at a second input frequency range passes amplifier 302b; a third RF input signal 314 at a third input frequency range passes amplifier 302c; and a millimeter wave frequency signal or a fourth RF signal at a fourth frequency range passes amplifier 302d.

In an embodiment, the input signals can be amplified based on the values set by AGC component 318. For example, AGC component 318 can be configured to amplify a received RF signal using variable gains to adjust the signal's power level according to a receiver's appropriate required signal power level. In particular, AGC component 318 can be configured to control a gain of amplifier 302a, 302b, 302c, and 302d. For example, full band digital RSSI read unit 322 is configured to measure the digitized output 305 of ADC 204. The measurement results from full band digital RSSI read unit 322 is passed to AGC component 318. AGC component 318 can utilize one or more gain adjust algorithms to set amplifier gains based on the level of input signal to avoid saturation during, for example, the early stages of the analog amplifier components. The algorithms can have the advantage of acquiring information about the strength of signal not only for the desired channel but also for the adjacent channels and the channels adjacent to them as long as they are inside the received band passed through a wide-band filter (e.g., filters 337a, 337b, 337c, 337d) of, for example, 800 MHz. Information about the signal strength of a set of channels enables the ability to learn about interference from adjacent channels, which can allow for adjusting the gain of amplifiers 302a. 302b, 302c, and 302d in a way that the adjacent channel or the blocker does not saturate the system. In conventional approaches, if a RSSI read unit were to be measured in the digital domain, the signal will have passed through a mixer and a filter, and thus, the adjacent channel is cut off by the receiver filter. This removes the necessary information an automatic control algorithm uses to adjust the gain.

Individual RF input signals can be filtered using bandpass filters (not shown) based on the defined band of operation. For instance, amplifiers 302a, 302b, 302c, and 302d can use a filter such as a bandpass filter (e.g., filters 337a, 337b, 337c, 337d) with more than 500 MHz of bandwidth to ensure most wider bands of operation are passed through an amplifier. In an embodiment, such an approach contributes to gain control algorithms and the canceling adjacent channel interference.

ADC 204 of the receive path is configured to convert the received signals from the analog to digital domain for further processing in the digital domain. As described, inputs 310, 312, 314, and 315 are coupled to ADC 204. ADC 204 can be associated with or be defined to have or at least be electrically coupled with multiple switches (e.g., switches 320a, 320b, 320c, 320d). The switches are operable to be connected or disconnected based on the band of operation and the input port (e.g., input ports 310, 312, 314, 315) in operation. For example, in the situation input port 310 is active, switch 320a couples the output of amplifier 302a with the input of ADC 204 and switches 320b, 320c, and 320d are disconnected. In another example, in the situation input port 315 is active (e.g., receiving a millimeter wave frequency signal at IF), switch 320d couples the output of amplifier 302d with the input of ADC 204.

In an embodiment, the sampling rate of ADC 204 can be controlled by ADC rate selector component 325 based on, for example, an input signal frequency and bandwidth. The sampling rate in various embodiments can be multiple times greater (e.g., two times greater) than the largest frequency of the input signal frequency and bandwidth. That is, given an input signal received at one of input ports 310, 312, 314, or 315, the sampling rate is multiple time greater, e.g., a threshold amount greater, than the largest frequency of the frequency at input port 310, input port 312, input port 314, or input port 315. A sampling rate multiple time greater than the largest frequency of the input signal frequency can be referred to as the first Nyquist zone. In an example for setting the sampling rate, for a signal received at input port 310, at a first frequency (e.g., 400 MHz), the sampling rate of ADC 204 can be set to at least 800 MHz. In another example, in the situation a millimeter wave frequency signal at IF of, for example, 5 GHz, is received at input port 315, the sampling rate of ADC 204 can be set to at, for example, at least 10 GHz.

In certain embodiments, the sampling rate can be set to under-sampling the signal received at input port 310, input port 312, input port 314, or input port 315. For example, for a signal received at input port 310, the sampling rate may be set to under-sampling due to the fact that the output of amplifier 302a, e.g., signal 303, is a passband signal (e.g., a signal with a frequency in the 2nd, 3rd, . . . Nyquist zones).

In an embodiment, to under-sample or sub-sample a pass-band signal, the sampling rate of ADC 204 should be at least two times greater than the bandwidth of the input signal while the sampling rate should be represented as:

$$f_s = \frac{4 \times f_c}{m_{odd}} \text{ while } m_{odd} = 3, 5, 7, 9, \ldots$$

where $f_s$ is the ADC sampling frequency, $f_c$ is the input signal center frequency. In the situation of sub-sampling, the bandpass signal after sampling by ADC 204 is folded and repeated in any of the Nyquist zones wherein each zone is defined as: first Nyquist zone is DC–1/2 $f_s$, second Nyquist zone is from 1/2 $f_s$ to $f_s$, third Nyquist zone is from fs to 3/2 fs, and fourth Nyquist zone is from 3/2 fs to 2$f_s$, and so on.

In an embodiment, sub-sampling includes using a plurality of wide-band low noise amplifiers (e.g., wide-band low noise filters 302a, 302b, 302c, 302d) with wide band filtering and high-speed RF ADC 204. ADC 204 can be configured to sample the analog signal with speed anywhere between 2GSample/s to 5GSample/s. ADC 204 sampling rate is determined by ADC rate selector component 325 based on signal center frequency ($f_c$) and signal bandwidth. ADC 204 can include a stop and hold system configured to sample signals at frequencies between 2 GHz and 5 GHz. In certain embodiments, ADC 204 includes a digitally assisted interleaved SAR-pipeline RF ADC. When implementing sub-sampling, ADC 204 sampling rate is selected based on the input signal frequency and band (known according to the selected band by the user of this modem). The sampling rate in certain embodiments can be a digital programming parameter that the transceiver software or user interface selects. In any case, this selection is based on the above formula and according to the input signal frequency and bandwidth.

The digitized output 305 can be received at DSP and filters component 208. In an embodiment, digitized output 305 can also be received at full band digital RSSI read unit 322. Full band digital RSSI read unit 322 is configured to measure the signal strength of digitized output 305 across the frequency band. This allows for increased accuracy compared to an analog RSSI read at the amplifiers since embodiments herein can measure the signal level using digital circuitry with less noise and more linearity. Also, full band digital RSSI read unit 322 can distribute processing with a digital baseband processing chipset (not shown) that is proximate radio frequency unit 106 via a control signal, while with an analog RSSI read this is not possible.

Digitized output 305 can be received at DSP and filters component 208, which includes digital mixers (e.g., digital mixers 306a, 306b, 306c, 306d) and digital filters (e.g., digital filters 324a, 324b, 324c, 324d). The digital filters can be operably coupled to filter digital signals to generate digital filtered signals according to the desired signal bandwidth. In an embodiment, the digital mixers and digital filters can be configured to process a digitized signal to down-convert the digitized signal to the baseband, thus eliminating many problems associated with direct conversion in the analog domain including IQ imbalance, DC offset, and flicker noise. For example, a digital mixer of the receive path can be configured to mix digitized output 305 to baseband. One of filter 324a, 324b, 324c, or 324d of the receive path is configured to remove out-of-band components.

FIG. 4 illustrates a block diagram of a system similar to FIG. 2B, but illustrates additional components of sending unit 122 in accordance with an embodiment. In this example, the band can be divided into four example groups. A group can be associated with a frequency range for a RF output signal for a transmit path. The output RF signals of each group can be illustrated as 410, 412, 414, and 416. That is, a first RF output includes a first RF output signal for RF signals between 400 MHz up to 1 GHz, a second RF output includes a second RF out for RF signals between 1.4 GHz up to 3.2 GHz, a third RF output includes a third RF out for RF signals between 3.2 GHz up to 5.2 GHz, and a fourth RF output includes a fourth RF out for millimeter wave signals that are down converted to IF frequencies between 5.2 GHz and 7.2 GHz. An example transmit path can be represented by interface 230, DAC 226, filter 224, buffer 405, digital mixer 406, combiner 407, and amplifier 408. Continuing with this transmit path, after the signal passes DAC 226 and analog I signal 402 and analog Q signal 404 are passed to filters 224, mixing component 406 is operable to mix the received signal. Amplifier 408 amplifies the mixed signal for one of the selected groups. In this example, signal frequency range 410.

Figure 5:
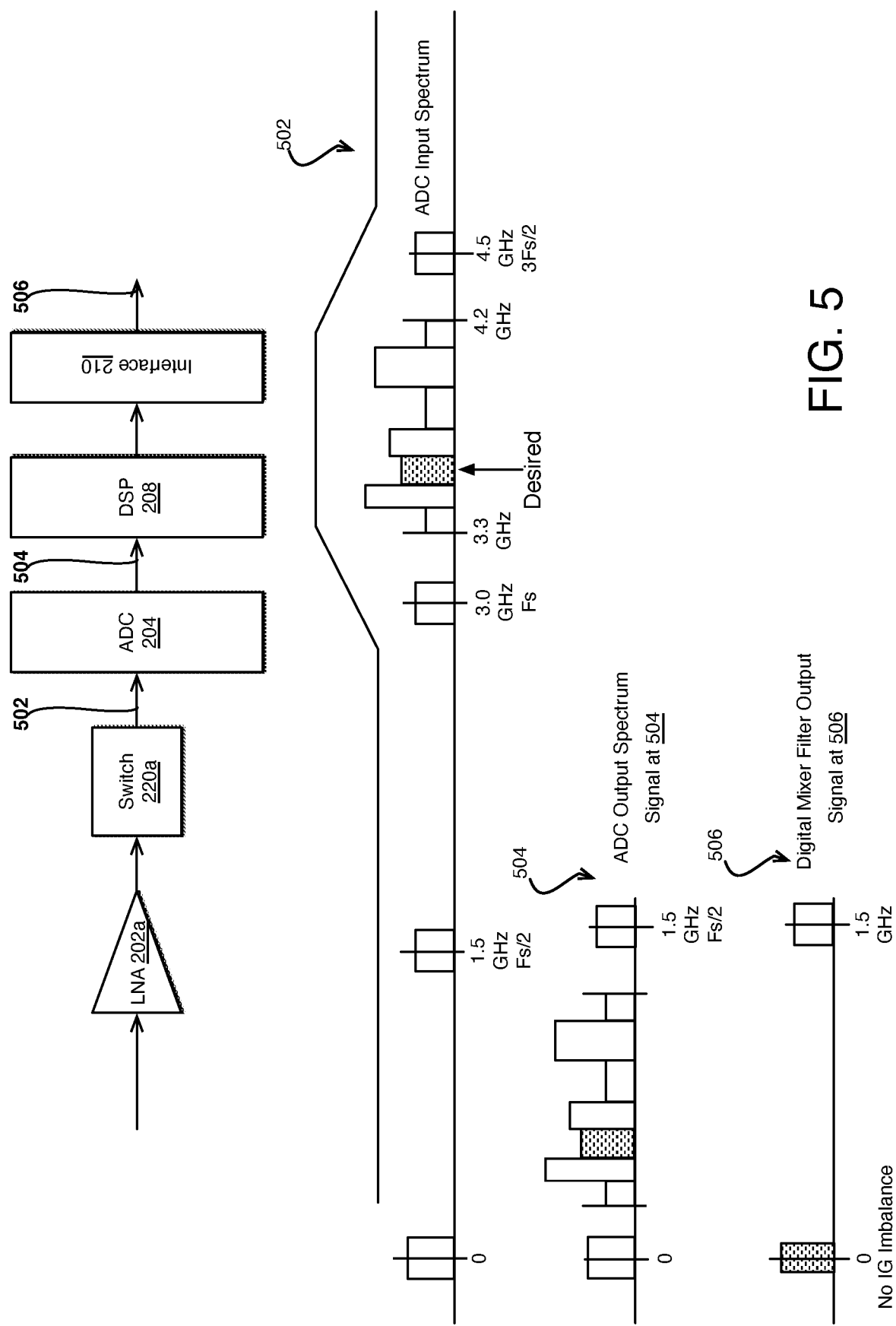
FIG. 5 illustrates an example frequency spectrum in accordance with transceiver architecture in accordance with an embodiment.

FIG. 5 illustrates an example frequency spectrum in accordance with various embodiments. In an embodiment, IQ imbalance is not present due to the direct conversion architecture described herein. Accordingly, IQ imbalance noise may cause many problems when it comes to improving signal to noise ratio in high modulation signals, and in particular, in wider bandwidth. This is due to the fact that in wider bandwidth signals, IQ imbalance noise is a function of frequency and due to its frequency selectivity, it's not trivial to estimate and compensate this noise at the receiver. Thus the SNR is limited when faster speed communication is needed on wider bandwidths. In this example, the frequency spectrum is illustrated at various locations along a receive path. A receive path, in an example, can include amplifier 202a, switch 220a, ADC 204, DSP and filters component 208, and digital interface 210. The signal after switch 220a can be represented by signal 502. The signal after ADC 204 can be represented by 504. The signal after digital interface 210 can be represented by 506. As shown in FIG. 5, signal 502 is passed to ADC 204 with center frequency and bandwidth associated with LNA 202a. Desired signal at 504 is seen in Nyquist zone 1 while ADC 204 sampling rate is 3 GHz and desired signal as well as adjacent unwanted signals around center frequency of 3.5 GHz are also seen in areas below 1.5 GHz. In this case, DSP 208 including digital mixers and filters down converts the desired signal to zero and filters all unwanted adjacent signals. In this way almost no IQ imbalance is presented in the signal.

In the embodiments described herein, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Figure 6:
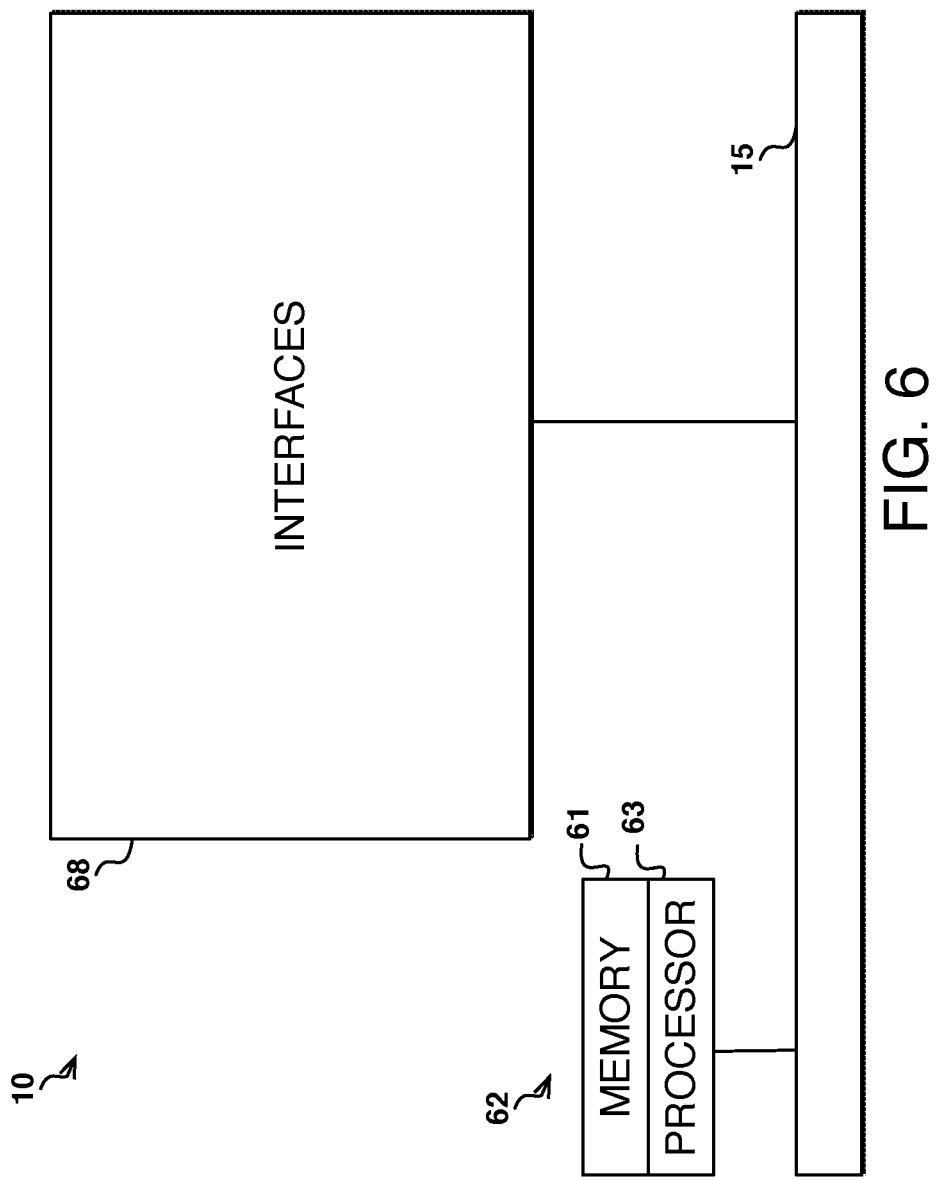
FIG. 6 illustrates an exemplary access device that can be utilized in accordance with various embodiments.

FIG. 6 illustrates an example of an exemplary network device 10, such as a cable modem, that can be utilized in accordance with various embodiments. Network device 10 includes a master central processing unit (CPU) 62, interfaces 68, and a bus 15 (e.g., a PCI bus). When acting under the control of appropriate software or firmware, the CPU 62 is responsible for numerous tasks, at least some of which relate to network management. It preferably accomplishes all these functions under the control of software including an operating system and any appropriate applications software. CPU 62 may include one or more processors 63. In an alternative embodiment, processor 63 is specially designed hardware for controlling the operations of network device 10. In a specific embodiment, a memory 61 (such as non-volatile RAM and/or ROM) also forms part of CPU 62. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communication's intensive tasks, these interfaces allow the master microprocessor 62 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations etc. is often used. Further, other types of interfaces and media could also be used with the router.

Regardless of the network device's configuration, it may employ one or more memories, or memory modules (including memory 61) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 7 illustrates an example of exemplary possible system embodiments, such a system making up network device 10 of FIG. 6. The more appropriate embodiment will be apparent to those of ordinary skill in the art when practicing the present technology. Persons of ordinary skill in the art will also readily appreciate that other system embodiments are possible. FIG. 7 illustrates a conventional system bus computing system architecture 23 wherein the components of the system are in electrical communication with each other using a bus 05.

Exemplary system xx00 includes a processing unit (CPU or processor) 60 and a system bus 05 that couples various system components including the system memory 17, such as read-only memory (ROM) 20 and random-access memory (RAM) 25, to the processor 60. The system xx00 can include a cache of high-speed memory connected directly with, in close proximity to, or integrated as part of the processor 60. The system xx00 can copy data from the memory 17 and/or the storage device 30 to the cache 33 for quick access by the processor 60. In this way, the cache can provide a performance boost that avoids processor 60 delays while waiting for data. These and other modules can control or be configured to control the processor 60 to perform various actions. Other system memory 17 may be available for use as well. The memory 17 can include multiple different types of memory with different performance characteristics. The processor 60 can include any general-purpose processor and a hardware module or software module, such as module 1 32, module 2 34, and module 3 36 stored in storage device 30, configured to control the processor 60 as well as a special-purpose processor where software instructions are incorporated into the actual processor design. The processor 60 may essentially be a completely self-contained computing system, containing multiple cores or processors, a bus, memory controller, cache, etc. A multi-core processor may be symmetric or asymmetric. The processor can be implemented with one or more virtual processors, as well as any combination of CPUs and virtual processors.

The communications interface 41 can generally govern and manage the user input and system output. There is no restriction on operating on any particular hardware arrangement, and therefore the basic features here may easily be substituted for improved hardware or firmware arrangements as they are developed.

Storage device 30 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 25, read-only memory (ROM) 20, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or another intangible medium to facilitate communication of such instructions. Transmission media includes coaxial cables, copper wire, and fiber optics, including wires that comprise bus 05 for transmitting a computer data signal.

The storage device 30 can include software modules 32, 34, 36 for controlling the processor 60. Other hardware or software modules are contemplated. The storage device 30 can be connected to the system bus 05. In one aspect, a hardware module that performs a particular function can include the software component stored in a computer-readable medium in connection with the necessary hardware components, such as the processor 60, bus 05, and so forth, to carry out the function.

For clarity of explanation, in some instances, the present technology may be presented as including individual functional blocks including functional blocks comprising devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. In some examples, hard-wired circuitry may be used in place of or in combination with software instructions for implementation. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments can be implemented in a wide variety of operating environments, which in some cases can include one or more user electronic devices, integrated circuits, chips, and computing devices—each with the proper configuration of hardware, software, and/or firmware as presently disclosed. Such a system can also include a number of the above exemplary systems working together to perform the same function disclosed herein—to filter tones from a mixed signal using novel integrated circuits in a communications network.

Most embodiments utilize at least one communications network that would be familiar to those skilled in the art for supporting communications using any of a variety of commercially available protocols, such as TCP/IP, FTP, UPnP, NFS, and CIFS. The communications network can be, for example, a cable network, a local area network, a wide-area network, a virtual private network, the Internet, an intranet, an extranet, a public switched telephone network, an infrared network, a wireless network and any combination thereof.

The environment can include a variety of data stores and other memory and storage media as discussed above-including at least a buffer. These storage components can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. An apparatus for receiving radio frequency (RF) signals, comprising:
    a transmit path for transmitting a transmit signal;
    a receive path for receiving receive signals, the receive path including a plurality of input signal ports, the plurality of input signal ports correspond to a plurality of receive path segments each coupled to a variable rate analog-to-digital converter (ADC), a first receive path segment including,
        a first low noise amplifier (LNA) and a first filter configured to receive a first receive signal associated with a first frequency range and a first bandwidth, the first LNA configured to amplify the first receive signal to generate an amplified receive signal,
        the variable rate ADC coupled with an ADC rate selection component, the ADC rate selection component configured to set a sampling rate of the variable rate ADC based on the first receive signal, the variable rate ADC configured to receive the amplified receive signal and generate a first digital signal based on the sampling rate assigned by the ADC rate selection component, wherein the sampling rate is less than a highest frequency of the first receive signal,
        a first switch component configured to couple the first low noise amplifier and the ADC,
        an automatic gain control (AGC) component configured to control a gain of the first LNA,
        a variable bandwidth digital signal processor (DSP) coupled to the variable rate ADC, and
        a second receive path segment, the second receive path segment including a second low noise amplifier, a second filter, and a second switch, the second filter configured to receive a second receive signal associated with a second frequency range and a second bandwidth, the second bandwidth at least a threshold times greater than the first bandwidth, an output of the second switch coupled with the variable rate ADC, wherein the variable rate ADC generates a second digital signal based on a fixed ADC sampling rate assigned to the second receive path by the ADC rate selection component; wherein the fixed ADC sampling rate is less than a highest frequency of the second receive signal; and
    wherein the receive path and transmit path are provided on a single die, and wherein a gain of at least the first LNA and the second LNA is based on an output of the variable rate ADC.

2. The apparatus of claim 1, wherein the apparatus is a small cell base station.

3. The apparatus of claim 1, wherein the apparatus is a cellular transceiver.

4. The apparatus of claim 1, further comprising:
a mixer component for decreasing a sample rate of a receive signal,
wherein the receive path and the mixer component are provided on the single die.

5. The apparatus of claim 1, wherein the apparatus is configured to:
determine the first frequency range associated with the first receive signal;
determine the first bandwidth associated with the first receive signal; and
determine the sampling rate of the variable rate ADC based on the first bandwidth.

6. The apparatus of claim 1, wherein the apparatus is configured to:
receive a sampling frequency parameter; and
use the sampling frequency parameter to set the sampling rate of the variable rate ADC.

7. The apparatus of claim 1, wherein the first LNA is coupled to a bandpass filter, the bandpass filter operable to pass frequencies satisfying a threshold bandwidth.

8. The apparatus of claim 1, wherein the variable rate ADC is coupled to a plurality of switches, individual switches being coupled to an RF input port, and wherein a switch is active when a corresponding RF input port is active.

9. The apparatus of claim 8, wherein individual input signal ports of the plurality of input signal ports operate within different frequency ranges.

10. The apparatus of claim 1, further including a plurality of LNAs, individual LNAs corresponding to one of the plurality of receive paths segments and configured for a frequency range and a bandwidth of a corresponding receive path.

11. The apparatus of claim 1, wherein the variable bandwidth DSP is configured to operate in a frequency range of the plurality of receive path segments and is operable to generate variable bandwidth signals.

12. The apparatus of claim 1, further comprising a low noise amplifier module, the low noise amplifier module including a plurality of low noise amplifiers and configured to receive a range of frequency input signals.

13. A network access device, comprising:
a transmit path for transmitting a transmit signal;
a receive path for receiving receive signals, the receive path including a plurality of input signal ports, the plurality of input signal ports correspond to a plurality of receive path segments each coupled to a variable rate analog-to-digital converter (ADC), a first receive path segment including,
a first low noise amplifier (LNA) and a first filter configured to receive a first receive signal associated with a first frequency range and a first bandwidth, the first LNA configured to amplify the first receive signal to generate an amplified receive signal,
the variable rate ADC coupled with an ADC rate selection component, the ADC rate selection component configured to set a sampling rate of the variable rate ADC based on the first receive signal, the variable rate ADC configured to receive the amplified receive signal and generate a first digital signal based on the sampling rate assigned by the ADC rate selection component, wherein the sampling rate is less than a highest frequency of the first receive signal,
a first switch component configured to couple the first low noise amplifier and the ADC,
an automatic gain control (AGC) component configured to control a gain of the first LNA,
a variable bandwidth digital signal processor (DSP) coupled to the variable rate ADC, and
a second receive path segment, the second receive path segment including a second low noise amplifier, a second filter, and a second switch, the second filter configured to receive a second receive signal associated with a second frequency range and a second bandwidth, the second bandwidth at least a threshold times greater than the first bandwidth, an output of the second switch coupled with the variable rate ADC, wherein the variable rate ADC generates a second digital signal based on a fixed ADC sampling rate assigned to the second receive path by the ADC rate selection component, wherein the fixed ADC sampling rate is less than a highest frequency of the second receive signal; and
wherein the receive path and transmit path are provided on a single die, and wherein a gain of at least the first LNA and the second LNA is based on an output of the variable rate ADC.

14. The network access device of claim 13, further comprising:
a mixer component for decreasing a sample rate of a receive signal,
wherein the receive path and the mixer component are provided on the single die.

15. The network access device of claim 13, wherein the network access device is configured to:
determine the first frequency range associated with the first receive signal;
determine the first bandwidth associated with the first receive signal; and
determine the sampling rate of the variable rate ADC based on the first bandwidth.

16. The network access device of claim 13, wherein the network access device is configured to:
receive a sampling frequency parameter; and
use the sampling frequency parameter to set the sampling rate of the variable rate ADC.

17. The network access device of claim 13, wherein the first LNA is coupled to a bandpass filter, the bandpass filter operable to pass frequencies satisfying a threshold bandwidth.

18. The network access device of claim 13, wherein the variable rate ADC is coupled to a plurality of switches, individual switches being coupled to an RF input port, and wherein a switch is active when a corresponding RF input port is active.

19. The network access device of claim 18, wherein individual input signal ports of the plurality of input signal ports operate within different frequency ranges.

20. The network access device of claim 13, wherein the variable bandwidth DSP is configured to operate in a frequency range of the plurality of receive path segments and is operable to generate variable bandwidth signals, and wherein the variable bandwidth digital signal processor includes a plurality of filters and a plurality of mixer components.

* * * * *